Nov. 24, 1959 R. GABRIEL 2,914,603

METHODS OF COMMUNICATING INTELLIGENCE BY TELEVISION

Filed Nov. 30, 1956

INVENTOR.
Richard Gabriel
BY Emery, Whittemore, Sandoe & Dix
ATTORNEYS 2,914,603

METHODS OF COMMUNICATING INTELLIGENCE BY TELEVISION

Richard Gabriel, New York, N.Y.

Application November 30, 1956, Serial No. 625,366

2 Claims. (Cl. 178—5.1)

This invention relates to methods of communicating intelligence by television.

It is an object of the invention to provide a method of communicating intelligence in which, assuming that the intelligence is to be communicated through the medium of visual symbols, such as letters of an alphabet, numbers, pictures, or the like, a visual representation of only a portion of each symbol is televised at a transmitting station and transmitted to receiving stations. At the receiving station, where the televised representation is reproduced as an image, a visual representation of another portion of the symbol to be communicated is brought into conjunction with said image, which, together with said image, forms a complete symbol. The portions of the symbols which are televised at the transmitting station can be mutilated in such fashion as to be quite unintelligible; and unless the reproduced images are supplemented at the receiving station in accordance with plan, cannot ordinarily be understood. The invention, therefore, makes possible the transmission of secret messages.

Other objects and advantages of the invention will appear hereinafter.

A preferred embodiment of the invention selected for purposes of illustration is shown in the accompanying drawings, in which, Figure 1 is a semi-diagrammatic perspective view of a television camera as used at the transmitting station.

Figures 1, 2, 3, 4, 5, 6, 7:
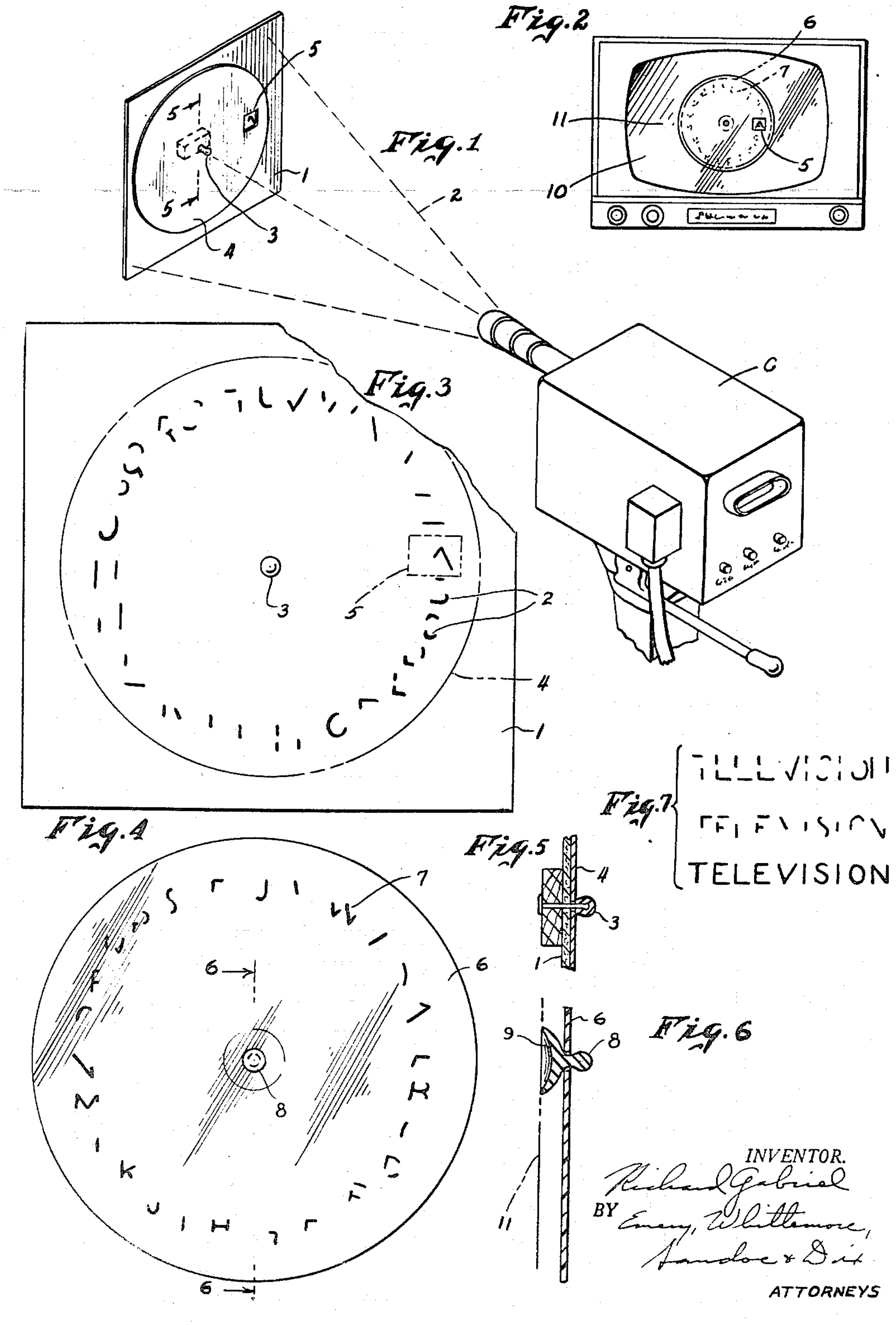
Figure 2 is a front elevation of a television receiving set.
Figure 3 is a front elevation of a panel having mutilated symbols thereon as used at the transmitting station.
Figure 4 is a front elevation of a disk having supplemental mutilated symbols thereon as used at the receiving set.
Figure 5 is a section on the line 5—5 of Figure 1.
Figure 6 is a section on the line 6—6 of Figure 4.
Figure 7 is an explanatory diagram showing the manner in which the mutilated symbols may be placed in conjunction to form complete symbols.

Referring to the drawings, the invention is illustrated as employed for the communication of intelligence by means of visual letters of the alphabet. For this purpose a portion of each letter to be communicated is televised by means of a television camera at a transmitting station and transmitted to television receiving stations where it is reproduced as an image on the screen of a picture tube. Thus, referring to Figure 7 and assuming that it is desired to communicate the word Television to persons at receiving stations, the mutilated letter portions illustrated in the top line of Figure 7 would be televised and transmitted to receiving stations. At the receiving stations, the images reproduced on the screen of the picture tube would be supplemented, either by prearranged plan, or by audible instructions transmitted from the transmitting station, by the letter portions illustrated in the middle line of Figure 7 by bringing the latter into conjunction with the reproduced images, to form complete, legible letters as illustrated in the bottom line of Fig. 7.

As a practical means of televising the mutilated letter portions at the transmitting station, the device illustrated in Figures 1, 3 and 5 may be used. This comprises a panel 1 having a series of mutilated letter portions 2 inscribed thereon in a circle surrounding the spindle 3. On the spindle 3 is mounted an opaque rotatable disk 4 having a window 5 therein in position to expose selected letter portions. By rotating the disk 4 the selected letter portions may be exposed successively and televised by the television camera C for transmission to receiving stations.

Each receiving station may be supplied with a transparent disk 6 having a series of letter portions 7 inscribed thereon in a circle surrounding the spindle 8, which said letter portions supplement the letter portions 2 in the manner illustrated in Figure 7. The disk 6 may be made of transparent plastic sheet material, glass or the like. The disk is rotatable on the spindle 8 and the spindle carries a vacuum cup 9 through which it may be secured to the face of the picture tube 10 of a television receiving set 11. By rotating the disk on the spindle 8 by prearranged plan or by audible instructions transmitted from the transmitting station, the proper letter portions 7 of the disk 6 may be brought into conjunction with the images of the letter portions transmitted from the transmitting station to form complete legible letters.

The sequence of the letter portions 7 inscribed on the disk 6 may be the same as or different from the sequence inscribed on the panel. If they are in the same sequence, the disk 6 need not be rotated during the transmission of the desired intelligence, for once the disk 6 is properly located, the televised image of each successive letter portion will appear at the proper position to be supplemented by the letter portions on the disk 6. If the sequence is different, however, the disk 6 will need to be rotated in accordance with prearranged plan or by audible instructions transmitted from the transmitting station to bring the letter portions 7 of the disk 6 into proper conjunction with the television images formed on the screen of the picture tube.

In the form illustrated, the invention may be used as an interesting and entertaining game for children in which secret messages are transmitted to them from the television station. It is possible, however, to use the invention for more serious purposes of transmitting secret intelligence particularly if special symbols, code or cipher characters, and the like, are used and televised in the manner described.

It will be understood that the invention may be variously modified and embodied within the scope of the subjoined claims.

I claim as my invention:

1. In combination a first plurality of visual representations of a portion only of symbols used in the communication of intelligence, a mask having an aperture therein, means for rotatably mounting said mask in front of said first plurality of visual representations, means whereby said mask is movable in a first predetermined pattern to sequentially expose through said aperture visual representations of said desired symbols, a television receiver having a screen, means for transmitting said sequentially exposed symbols, means for receiving said transmitted symbols and for presenting said symbols on the screen of the television receiver at predetermined positions thereon, a transparent disc having other portions of said symbols printed opaquely thereon, means for rotatably mounting said disc in front of said screen, means whereby said disc is rotatable in a second predetermined pattern to sequentially align said presented symbol on the screen of said receiver with the other portion of said symbol on said transparent disc to sequentially form complete symbols from said sequentially transmitted symbol portions and said symbol portions on said disc.

2. In combination a first plurality of visual representations of a portion only of symbols used in the communication of intelligence, an opaque disc-shaped mask having an aperture therein, means for rotatably mounting said mask in front of said first plurality of symbols, means whereby said mask is rotatable in a first predetermined pattern to sequentially expose through said aperture visual representations of desired symbols, a television receiver having a screen, means for transmitting said sequentially exposed symbols, means for receiving said transmitted symbols and for presenting said symbols on the screen of said television receiver at predetermined positions thereon, a transparent disc having other portions of said symbols printed opaquely thereon in a predetermined pattern, means for mounting said disc in front of said screen with said symbol portions on said disc aligned with said predetermined positions to sequentially form complete symbols from said sequentially transmitted symbol portions and said symbol portions on said disc.

References Cited in the file of this patent

UNITED STATES PATENTS

| | | |
|---|---|---|
| 1,910,540 | Hammond | May 23, 1933 |
| 2,404,839 | Hammond | July 30, 1946 |
| 2,417,163 | Horst | Mar. 11, 1947 |
| 2,624,958 | Fine | Jan. 13, 1953 |
| 2,732,655 | Dirckx | Jan. 31, 1956 |